United States Patent
Gustavson et al.

(10) Patent No.: US 7,571,435 B2
(45) Date of Patent: Aug. 4, 2009

(54) METHOD AND STRUCTURE FOR PRODUCING HIGH PERFORMANCE LINEAR ALGEBRA ROUTINES USING PRELOADING OF FLOATING POINT REGISTERS

(75) Inventors: Fred Gehrung Gustavson, Briarcliff Manor, NY (US); John A. Gunnels, Mt. Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 830 days.

(21) Appl. No.: 10/671,937

(22) Filed: Sep. 29, 2003

(65) Prior Publication Data

US 2005/0071407 A1    Mar. 31, 2005

(51) Int. Cl.
*G06F 9/45* (2006.01)
*G06F 7/38* (2006.01)

(52) U.S. Cl. .................... 717/161; 717/151; 717/159; 717/160; 708/495; 708/520

(58) Field of Classification Search .............. None
See application file for complete search history.

(56) References Cited

U.S. PATENT DOCUMENTS

| | | | |
|---|---|---|---|
| 5,025,407 A | 6/1991 | Gulley et al. | |
| 5,099,447 A | 3/1992 | Myszewski | |
| 5,438,669 A * | 8/1995 | Nakazawa et al. | 712/222 |
| 5,513,366 A | 4/1996 | Agarwal et al. | |
| 5,644,517 A | 7/1997 | Ho | |
| 5,825,677 A | 10/1998 | Agarwal et al. | |
| 5,944,819 A | 8/1999 | Kumar et al. | |
| 5,983,230 A | 11/1999 | Gilbert et al. | |
| 6,021,420 A | 2/2000 | Takamuki | |
| 6,115,730 A * | 9/2000 | Dhablania et al. | 708/505 |
| 6,357,041 B1 | 3/2002 | Pingali et al. | |
| 6,470,368 B1 | 10/2002 | Garg et al. | |
| 6,507,892 B1 * | 1/2003 | Mulla et al. | 711/131 |
| 6,601,080 B1 | 7/2003 | Garg | |
| 6,675,106 B1 | 1/2004 | Keenan et al. | |
| 7,028,168 B2 | 4/2006 | Wadleigh | |
| 7,031,994 B2 | 4/2006 | Lao et al. | |
| 2003/0088600 A1 | 5/2003 | Lao et al. | |
| 2004/0148324 A1 | 7/2004 | Garg | |

OTHER PUBLICATIONS

Dongarra et al., A Set of Level 3 Basic Linear Algebra Subprograms, ACM Transactions on Mathematical Software, vol. 16, No. 1, Mar. 1990, pp. 1-17.*

Volume 1, "Foundations of Computer-Aided Chemical Process Design" Copyright 1981, American Institute of Chemical Engineering (2-Volume Series), pp. 77-143.

(Continued)

*Primary Examiner*—Tuan Q Dam
*Assistant Examiner*—Zheng Wei
(74) *Attorney, Agent, or Firm*—McGinn IP Law Group, PLLC

(57) ABSTRACT

A method (and structure) for executing linear algebra subroutines, includes, for an execution code controlling operation of a floating point unit (FPU) performing the linear algebra subroutine execution, unrolling instructions to preload data into a floating point register (FReg) of the FPU. The unrolling generates an instruction to load data into the FReg and the instruction is inserted into a sequence of instructions that execute the linear algebra subroutine on the FPU.

20 Claims, 4 Drawing Sheets

OTHER PUBLICATIONS

"Improving performance of linear algebra algorithms for dense matrices, using algorithmic prefetch" R. C. Agarwal, F. G. Gustavson, M. Zubair; IBM Journal of Research and Development; vol. 38, Issue 3 (May 1994); pp. 265-275; Year of Publication: 1994.

Gunnels, et al., "A Family of High-Performance Matrix Multiplication Algorithms", ICCS 2001, LNCS 2073, pp. 51-60, 2001 (also available at http://www.cs.utexas.edu/users/flame/pubs/ICCS2001.pdf).

Gunnels, et al., "A Novel Theoretical Model Produces Matrix Multiplication Algorithms That Predict Current Practice", IBM Research Report RC23443 (W0411-176), Nov. 19, 2004.

Phillip et al., PLAPACK: Parallel Linear Algebra Package Design Overview, 1997, IEEE Proceedings of the ACM/IEEE SC97 Conference.

Agarwal et al., A High Performance Algorithm Using Pre-Processing for the Sparse Matrix-Vector Multiplication, 1992, IEEE, pp. 32-41.

Fred G. Gustavson and Andre Henriksson and Isak Jonsson and Bo Kagstrom and Per Ling: Superscalar GEMM-based Level 3 BLAS The On-going Evolution of a Portable and High-Performance Library (1998); Applied Parallel Computing, Published 1998, Springer, pp. 207-215.

Vinod et al., A Framework for high-performance matrix multiplication based on hierarchical abstractions, algorithms and optimized low-level kernels, 2002, Concurrency and Computation: Practice and Experience 14(10): 805-839.

\* cited by examiner

METHOD AND STRUCTURE FOR PRODUCING HIGH PERFORMANCE LINEAR ALGEBRA ROUTINES USING PRELOADING OF FLOATING POINT REGISTERS

CROSS-REFERENCE TO RELATED APPLICATIONS

The following seven Applications, including the present Application, are related:

1. U.S. patent application Ser. No. 10/671,887, filed on Sep. 29, 2003, to Gustavson et al., entitled "METHOD AND STRUCTURE FOR PRODUCING HIGH PERFORMANCE LINEAR ALGEBRA ROUTINES USING COMPOSITE BLOCKING BASED ON L1 CACHE SIZE";

2. U.S. patent application Ser. No. 10/671,933, filed on Sep. 29, 2003, to Gustavson et al., entitled "METHOD AND STRUCTURE FOR PRODUCING HIGH PERFORMANCE LINEAR ALGEBRA ROUTINES USING A HYBRID FULL PACKED STORAGE FORMAT";

3. U.S. patent application Ser. No. 10/671,888, filed on Sep. 29, 2003, to Gustavson et al., entitled "METHOD AND STRUCTURE FOR PRODUCING HIGH PERFORMANCE LINEAR ALGEBRA ROUTINES USING REGISTER BLOCK DATA FORMAT";

4. U.S. patent application Ser. No. 10/671,889, filed on Sep. 29, 2003, to Gustavson et al., entitled "METHOD AND STRUCTURE FOR PRODUCING HIGH PERFORMANCE LINEAR ALGEBRA ROUTINES USING LEVEL 3 PREFETCHING FOR KERNEL ROUTINES";

5. U.S. patent application Ser. No. 10/671,937, filed on Sep. 29, 2003, to Gustavson et al., entitled "METHOD AND STRUCTURE FOR PRODUCING HIGH PERFORMANCE LINEAR ALGEBRA ROUTINES USING PRELOADING OF FLOATING POINT REGISTERS";

6. U.S. patent application Ser. No. 10/671,935, filed on Sep. 29, 2003, to Gustavson et al., entitled "METHOD AND STRUCTURE FOR PRODUCING HIGH PERFORMANCE LINEAR ALGEBRA ROUTINES USING A SELECTABLE ONE OF SIX POSSIBLE LEVEL 3 L1 KERNEL ROUTINES"; and 7. U.S. patent application Ser. No. 10/671,934, filed on Sep. 29, 2003, to Gustavson et al., entitled "METHOD AND STRUCTURE FOR PRODUCING HIGH PERFORMANCE LINEAR ALGEBRA ROUTINES USING STREAMING"; all assigned to the present assignee, and all incorporated herein by reference.

BACKGROUND OF THE INVENTION

1. Field of the Invention

The present invention relates generally to techniques for improving performance for linear algebra routines, with special significance to optimizing the matrix multiplication process, as exemplarily implemented as improvements to the existing LAPACK (Linear Algebra PACKage) standard. More specifically, preloading techniques allow a steady and timely flow of matrix data into floating point registers of floating point units (FPUs).

2. Description of the Related Art

Scientific computing relies heavily on linear algebra. In fact, the whole field of engineering and scientific computing takes advantage of linear algebra for computations. Linear algebra routines are also used in games and graphics rendering. Typically, these linear algebra routines reside in a math library of a computer system that utilizes one or more linear algebra routines as a part of its processing. Linear algebra is also heavily used in analytic methods that include applications such as supply chain management, as well as numeric data mining and economic methods and models.

A number of methods have been used to improve performance from new or existing computer architectures for linear algebra routines. However, because linear algebra permeates so many calculations and applications, a need continues to exist to optimize performance of matrix processing.

More specific to the technique of the present invention, it has been recognized by the present inventors that performance loss occurs for linear algebra processing when the data for processing has not been loaded into cache or working registers by the time the data is required for processing by the linear algebra processing subroutine.

SUMMARY OF THE INVENTION

In view of the foregoing and other exemplary problems, drawbacks, and disadvantages, it is, therefore, an exemplary feature of the present invention to provide various techniques that improve performance for linear algebra routines.

It is another exemplary feature of the present invention to improve factorization routines which are key procedures of linear algebra matrix processing.

It is another exemplary feature of the present invention to provide a more efficient technique to access data in linear algebra routines in floating point registers (FRegs) for Floating Point Units (FPUs).

To achieve these and other exemplary features, in a first exemplary aspect of the present invention, described herein is a method (and structure) for executing a linear algebra subroutine, including, for an execution code controlling operation of a floating point unit (FPU) performing the linear algebra subroutine execution, unrolling instructions to preload data into floating point registers (FRegs) of the FPU. The unrolling generates instructions to load data into the FRegs, and these instructions are inserted into a sequence of instructions that execute the linear algebra subroutine on the FPU.

In a second exemplary aspect of the present invention, also described herein is a signal-bearing medium tangibly embodying a program of machine-readable instructions executable by a digital processing apparatus to perform the above-described method.

In a third exemplary aspect of the present invention, also described herein is a method of at least one of solving and applying a scientific/engineering problem, including at least one of: using a linear algebra software package that computes one or more matrix subroutines in accordance with the above-described method; providing a consultation for solving a scientific/engineering problem using the method; transmitting a result of having used the method on at least one of a network, a signal-bearing medium containing machine-readable data representing the result, and a printed version representing the result; and receiving a result of a linear algebra software package that uses the method on at least one of a network, a signal-bearing medium containing machine-readable data representing the result, and a printed version representing the result.

BRIEF DESCRIPTION OF THE DRAWINGS

The foregoing and other exemplary purposes, aspects and advantages will be better understood from the following detailed description of exemplary embodiments of the invention with reference to the drawings, in which.

DETAILED DESCRIPTION OF EXEMPLARY EMBODIMENTS OF THE INVENTION

Figure 1:
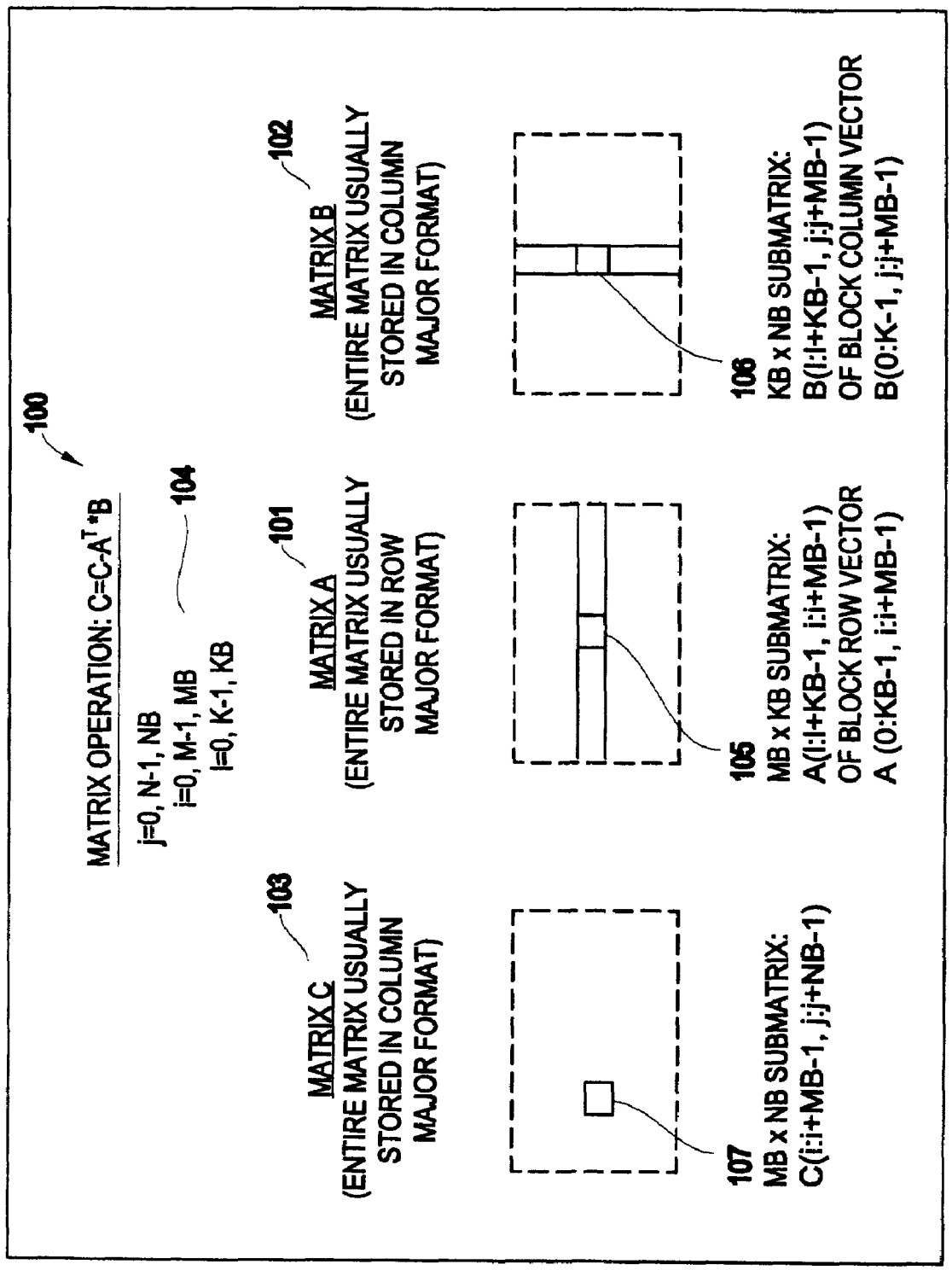
FIG. 1 illustrates a matrix representation for an operation 100 exemplarily discussed herein.

Referring now to the drawings, and more particularly to FIG. 1, an exemplary embodiment of the present invention will now be discussed. The present invention addresses efficiency in the calculations of linear algebra routines. The exemplary technique discussed herein was developed for the IBM Power 3® 630 system design.

FIG. 1 exemplarily illustrates a processing of the matrix operation $C=C-A^T*B$. For purpose of discussion only, Level 3 BLAS (Basic Linear Algebra Subprograms) of the LAPACK (Linear Algebra PACKage) are used, but it is intended to be understood that the concepts discussed herein are easily extended to other linear algebra mathematical standards and math library modules.

FIG. 1 illustrates processing of an exemplary matrix operation 100 (e.g., $C=C-A^T*B$). In processing this operation, matrix A is first transposed to form transpose-matrix-A (e.g., $A^T$) 101. Next, transposed matrix $A^T$ is multiplied with matrix B 102 and then subtracted from matrix C 103. The computer program executing this matrix operation will achieve this operation using three loops 104 in which the element indices of the three matrices A, B, C will be varied in accordance with the desired operation.

That is, as shown in the lower section of FIG. 1, the inner loop and one step of the middle loop will cause indices to vary so that MB rows 105 of matrix $A^T$ will multiply with NB columns 106 of matrix B. The index of the outer loop will cause the result of the register block row/column multiplications to then be subtracted from the MB-by-NB submatrix 107 of C to form the new submatrix 107 of C. FIG. 1 shows an exemplary "snapshot" during execution of one step of the middle loop i=i:i+MB-1 and all steps of the inner loop 1, with the outer loop j=j:j+NB-1.

Somewhat related to the present invention, a key idea of the generalized streaming discussed in the sixth and seventh above-referenced copending applications is the generalization of Example 1 shown in FIG. 1 for higher levels of the memory hierarchy. In Example 1, there is a cache resident matrix $A^T$ of size K1×M1, a vector block B of size K1×N0, and a scalar block C of size M0×N0. At a given instant of time, the sizes of the vector block and scalar block is of order 0 and the size of the A is of order 1.

All of a piece of C and part of a piece of B has size of order 2, and these pieces of C and B reside in the next higher level of the memory hierarchy, namely L2 cache. In L2 cache we have cache resident matrix C of size M2×N2 and, at a given instant in time, streaming pieces (vector block B of size K1×N2) and scalar block A of size M1×K1.

Before stopping here, we mention briefly TLB (Translation Lookaside Buffer). The TLB is a term well understood in the art as referring to accessing data residing in the memory spanned by the current TLB pages. Usually, the size of the TLB is a sizable fraction of the size of the L2 cache.

Thus, in the above paragraph, the size of N2 is chosen so that the cache resident piece and the two streaming pieces can "fit" into the TLB. By doing so, TLB thrashing can be avoided.

Returning, the generalization should be clear. In level 3 cache, we have cache resident matrix piece of A of size M3×K3 and, at a given instance of time, a vector block piece of B of size K3×N2 and a scalar block piece of C of size M2×N2.

In an exemplary embodiment of the present invention, a data preloading technique is taught for preloading data into floating-point registers (FRegs) of floating-point units (FPUs). However, before presenting the details of the present invention, the following general discussion provides a background of linear algebra subroutines and computer architecture as related to the terminology used herein.

Linear Algebra Subroutines

The explanation of the present invention includes reference to the computing standard called LAPACK (Linear Algebra PACKage) and to various subroutines contained therein. LAPACK is well known in the art and information is readily available on the Internet. When LAPACK is executed, the Basic Linear Algebra Subprograms (BLAS), unique for each computer architecture and provided by the computer vendor, are invoked. LAPACK comprises a number of factorization algorithms for linear algebra processing.

For example, Dense Linear Algebra Factorization Algorithms (DLAFAs) include matrix multiply subroutine calls, such as Double- precision Generalized Matrix Multiply (DGEMM). At the core of level 3 Basic Linear Algebra Subprograms (BLAS) are "L1 kernel" routines which are constructed to operate at near the peak rate of the machine when all data operands are streamed through or reside in the L1 cache.

The most heavily used type of level 3 L1 DGEMM kernel is Double-precision A Transpose multiplied by B (DATB), that is, $C=C-A^T*B$, where A, B, and C are generic matrices or submatrices, and the symbology $A^T$ means the transpose of matrix A (see FIG. 1). It is noted that DATB is the only such kernel employed by today's state of the art codes, although DATB is only one of six possible kernels.

The DATB kernel operates so as to keep the A operand matrix or submatrix resident in the L1 cache. Since A is transposed in this kernel, its dimensions are K1 by M1, where K1×M1 is roughly equal to the size of the L1. Matrix A can be viewed as being stored by row, since in Fortran, a non-transposed matrix is stored in column-major order and, thus, a transposed matrix is equivalent to a matrix stored in row-major order. Because of asymmetry (C is both read and written) K1 is usually made to be greater than M1, as this choice leads to superior performance.

Exemplary Computer Architecture

Figure 2:
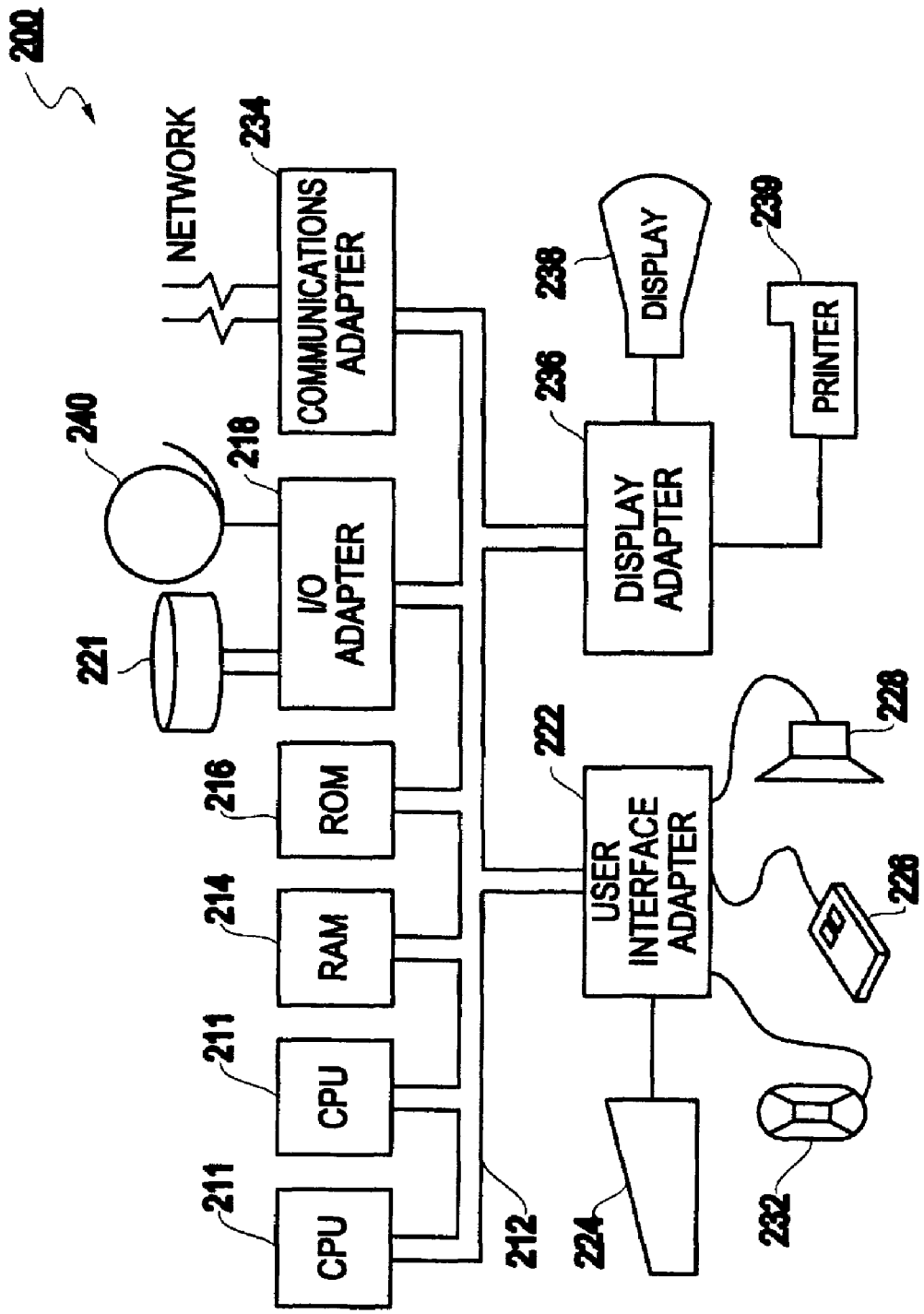
FIG. 2 illustrates an exemplary hardware/information handling system 200 for incorporating the present invention therein.

FIG. 2 shows a typical hardware configuration of an information handling/computer system 200 usable with the present invention. Computer system 200 preferably has at least one processor or central processing unit (CPU) 211. Any number of variations are possible for computer system 200, including various parallel processing architectures and architectures that incorporate one or more FPUs (floating-point units).

In the exemplary architecture of FIG. 2, the CPUs 211 are interconnected via a system bus 212 to a random access memory (RAM) 214, read-only memory (ROM) 216, input/output (I/O) adapter 218 (for connecting peripheral devices such as disk units 221 and tape drives 240 to the bus 212), user interface adapter 222 (for connecting a keyboard 224, mouse 226, speaker 228, microphone 232, and/or other user interface device to the bus 212), a communication adapter 234 for connecting an information handling system to a data processing network, the Internet, an Intranet, a personal area network (PAN), etc., and a display adapter 236 for connecting the bus 212 to a display device 238 and/or printer 239 (e.g., a digital printer or the like).

Although not specifically shown in FIG. 2, the CPU of the exemplary computer system could typically also include one or more floating-point units (FPUs) that performs floating-point calculations. Computers equipped with an FPU perform certain types of applications much faster than computers that lack one. For example, graphics applications are much faster with an FPU. An FPU might be a part of a CPU or might be located on a separate chip. Typical operations are floating point arithmetic, such as fused multiply/add (FMA), addition, subtraction, multiplication, division, square roots, etc.

Figure 3:
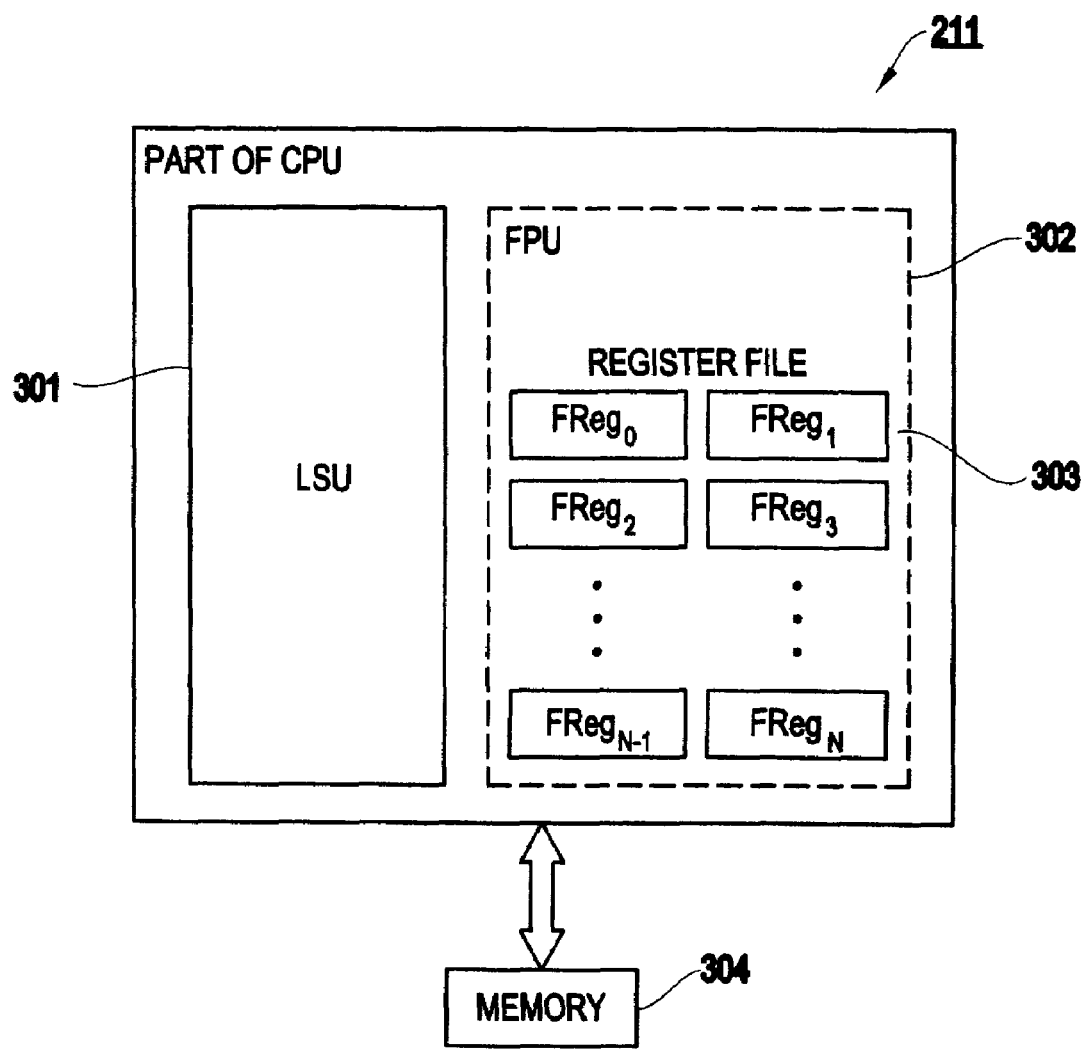
FIG. 3 illustrates an exemplary CPU/Floating Point Unit (FPU) architecture 302 as might be used to incorporate the present invention.

Details of the FPU are not so important for an understanding of the present invention, since a number of configurations are well known in the art. FIG. 3 shows an exemplary typical CPU 211 that includes at least one FPU 302. The FPU function of CPU 211 controls the FMAs (floating-point multiply/add), at least one load/store unit (LSU) 301 to service a number of floating point registers (FReg's) 303.

It is noted that in the context of the present invention involving linear algebra processing, the term "FMA" can also be translated as "fused multiply-add" operation/unit, and the present discussion does not care which of the translations is used. The role of the LSU 301 is to move data from a memory device 304 to the registers 303 used by the FPU 302, and to subsequently transfer the results back into the memory device 304.

Figures 4, 5:
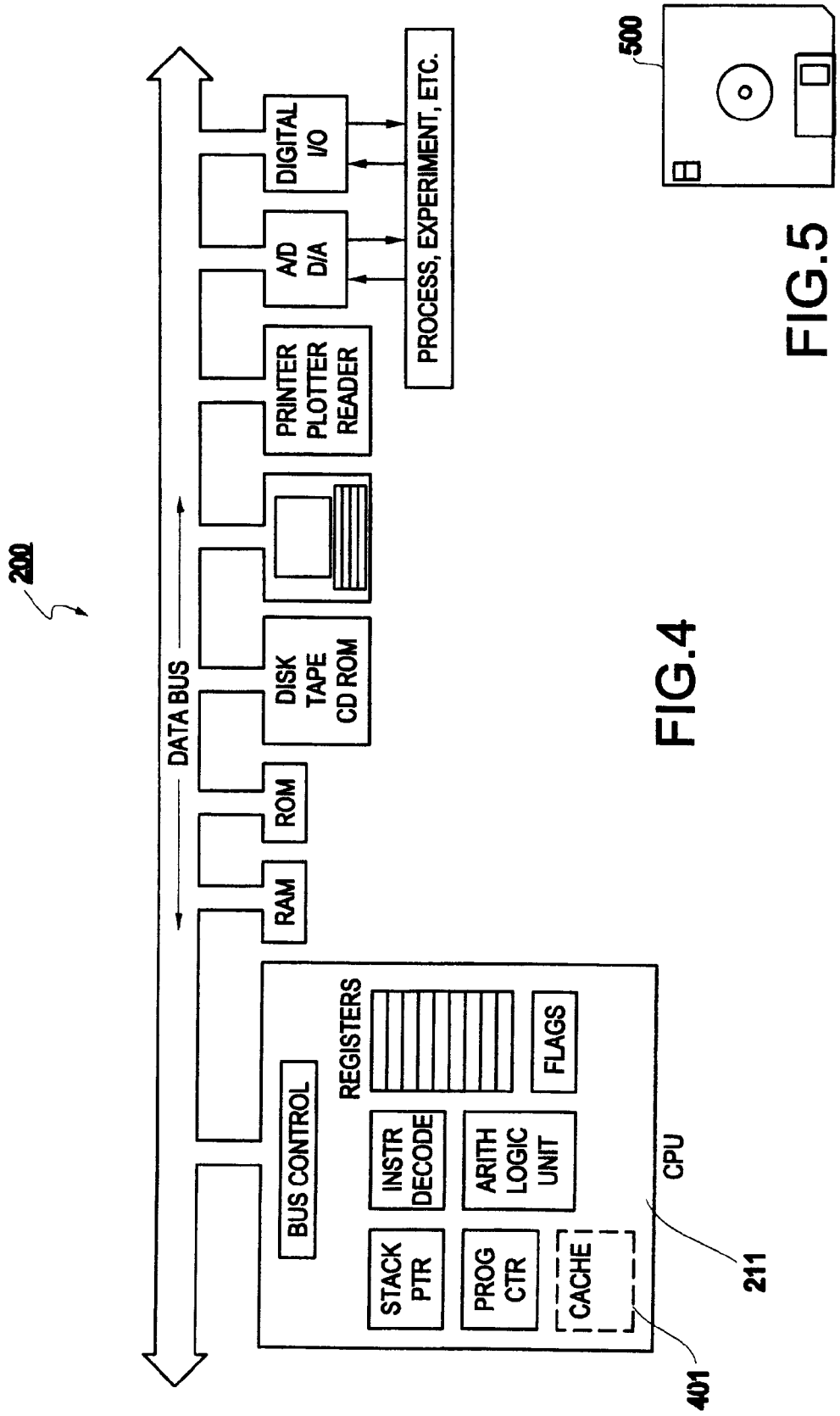
FIG. 4 exemplarily illustrates in more detail the CPU 211 that might be used in a computer system 200 for the present invention, as including a cache.
FIG. 5 illustrates an exemplary signal bearing medium 500 (e.g., storage medium) for storing steps of a program of a method according to the present invention.

Another important aspect of the present invention relates to computer architecture that incorporates a memory hierarchy involving one or more cache memories. FIG. 4 shows in more detail how the computer system 200 might incorporate a cache 401 in the CPU 211.

Discussion of the present invention includes reference to levels of cache, and more specifically, level 1 cache (L1 cache), level 2 cache (L2 cache) and even level 3 cache (L3 cache). Level 1 cache is typically considered as being a cache that is closest to the CPU and might even be included as a component of the CPU, as shown in FIG. 4. A level 2 (and higher-level) cache is typically considered as being cache outside the CPU.

The details of the cache structure and the precise location of the cache levels are not so important to the present invention so much as recognizing that memory is hierarchical in nature in modem computer architectures, and that matrix computation can be enhanced considerably by modifying the processing of matrix subroutines to include considerations of the memory hierarchy.

Additionally, in the present invention, it is preferable that the matrix data be laid out contiguously in memory in "stride one" form. "Stride one" means that the data is preferably contiguously arranged in memory to honor double-word boundaries and the useable data is retrieved in increments of the line size.

Preloading Matrix Data into FPUs

In the exemplary embodiment of the present invention, a preloading of matrix data will be demonstrated, in which the floating-point registers (FREGs) will be loaded several (e.g., 5 or so) cycles ahead of their use. The five-or-so cycle penalty that occurs is an example of an L1 cache-FPU register interface constraint that is discussed in the third above-referenced copending application. It is noted in passing that the the register blocking discussed in that third application, in combination with the nature of matrix multiplication, allows this 5-or-so cycle penalty to be avoided.

To achieve the preloading of the present invention, all loops will be unrolled so that loads can occur every cycle until the preload condition has been satisfied. The general principle that allows this to happen is that loads are balanced with FMAs, and that FMAs/LOADs=O(n), as will be explained below.

For purposes of the present invention, "operation" is any level-3 BLAS or other level-3 operation (e.g., matrix factorization), but, as an exemplary specific example, matrix multiplication is used in the following discussion. As discussed in more detail in other of the above-listed copending applications and below, there are six kernel types (e.g., ways of ordering three loops) possible for matrix multiplication. In the following exemplary discussion, LS stands for Line Size, and, as an exemplary hardware example, the IBM 630 Power 3® system will be used, wherein LS=16.

First, it is noted that, in the matrix multiplication processing, the number of FMAs in the calculation exceeds the number of load stores. That is, in the matrix multiplication algorithm, C=C+A*B (where C is an m×n matrix, A is a m×k matrix, and B is a k×n matrix), the number of:

FMAs=m*n*k;
Loads=mn+mk+kn; and
Stores=mn.
Since m, n, k are integers, mnk≧mn+mk+kn (Eqn. A)
Let E=mnk−(mn+mk+kn) (Eqn. E) or, equivalently
E=mnk (1−(1/m+1/n+1/k)). Here, "E" stands for "excess".

The above holds for the two DDOT kernel types. For the four DAXPY kernel types, equations (A) and (E) require an additional mn stores.

That is, it makes no difference in the ordering of the looping for the m, n, k dimensions. Since there are 3×2=6 different ways to arrange three parameters, there are six kernel types that will execute the loops shown in FIG. 1. It is noted that conventional linear algebra routines typically use only one of these possible six kernel types. The sixth of the above-listed copending applications addresses this conventional constraint.

Therefore, an exemplary aspect of the present invention is that of being able to use (e.g., selectively, according to the designer's requirements and desires and the situation at hand) any one of the six kernel types, rather than one, to execute linear algebra routines such as shown in FIG. 1.

The importance of having six kernel types available is that stride one memory access is desirable for matrix processing. The matrices A and B are usually stored either by row or by column. By having six kernel types, a kernel can be selected in which stride one is available for both operands. Having only one kernel type, instead of six kernel types, means that data copy must be done to provide the format of the one conventional kernel. This means a certain performance loss that might have to be repeated several times.

The fundamental imbalance of Equation A above will be utilized in the present invention. Therefore, the following criteria will also hold for all six kernel types:

1) Hardware Design Criterion: A load/store unit is capable of issuing a load operation every cycle. Also, the FPU is capable of issuing an FMA every cycle. Based on the above discussion, a single FMA and a single load/store issued every cycle will cover (e.g., exhaust) the load/store unit first, as $E \geq 0$ for sufficiently large m, n, and k (i.e. m,n,k$\geq$3).

2) The full calculation (e.g., kernel type) is done via loop unrolling via register blocking. Hence, the kernel is being performed via a series of register block computations. Therefore, Equation A above becomes: $m0*n0*k0 \geq m0*n0 + m0*k0 + k0*n0$ (Eqn. A0) and Equation E becomes $E0 = m0*n0*k0 - (m0*n0 + m0*k0 + k0*n0)$ (Eqn. E0). In these equations, the "0" indicates that a level-0 [register-level] register-blocking is occurring.

The term "register blocking" means choosing m0, n0, k0 so that there are enough FRegs to hold the blocking of the matrices of sizes m0, n0, k0. A computer typically has a certain number R of floating registers FRegs. The number of registers needed for DGEMM is $(m0+1)(n0+1)$. Thus, $(m0+1)(n0+1) \leq R$.

Since, over the register-blocking level, $E>0$, loading of operands will start to "outdistance" the consumption (mathematical employment) of those operands. Any given kernel type, from the previously mentioned six types, has both Equations A0 and E0 holding. Also, over all the six kernel types, it is assumed that $2m0*n0 + m0*k0 + k0*n0 < m0n0k0$, so that loading matrix operands do not exceed the floating point operations.

As an example, for the "DOT" kernels (e.g., dot product of two vectors. The excess of the inner loop is $E = k0*m0*n0 - k0(m0+n0)$. Clearly, using the IBM 630 Power 3® system as an example, with k0=1 and m0=n0=4, then E=8 and then one can achieve a preloading of 5 (as mentioned above) by loading the next m0+n0 elements of A and B for l=L+1, during the execution of the loop for l=L. To reach this steady state, it is usually necessary to enter the inner loop one or two times until load/stores can exceed FMAs in E0.

It should be apparent that the present invention can be combined with the concepts of one or more of the above-listed co-pending Applications to provide even higher levels of performance.

Software Product Embodiments

In addition to the hardware/software environment described above, a different exemplary aspect of the invention includes a computer-implemented method for performing the invention.

Such a method may be implemented, for example, by operating a computer, as embodied by a digital data processing apparatus, to execute a sequence of machine-readable instructions. These instructions may reside in various types of signal-bearing media.

Thus, this exemplary aspect of the present invention is directed to a programmed product, comprising signal-bearing media tangibly embodying a program of machine-readable instructions executable by a digital data processor incorporating the CPU 211 and hardware above, to perform the method of the invention.

This signal-bearing media may include, for example, a RAM contained within the CPU 211, as represented by the fast-access storage for example. Alternatively, the instructions may be contained in another signal-bearing media, such as a magnetic data storage diskette 500 (FIG. 5), directly or indirectly accessible by the CPU 211.

Whether contained in the diskette 500, the computer/CPU 211, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless.

The second exemplary aspect of the present invention can be embodied in a number of variations, as will be obvious once the present invention is understood. That is, the methods of the present invention could be embodied as a computerized tool stored on diskette 500 that contains a series of matrix subroutines to solve scientific and engineering problems using matrix processing.

Alternatively, diskette 500 could contain a series of subroutines that allow an existing tool stored elsewhere (e.g., on a CD-ROM) to be modified to incorporate one or more of the features of the present invention which will be described shortly. It should also be obvious to one of skill in the art that the matrix subroutines described or referred to herein can be downloaded through a network interface from a remote storage facility.

All of these various embodiments are intended as included in the present invention, since the present invention should be appropriately viewed as methods to provide efficiency in the computation of conventional matrix subroutines by prefetching data to be in the FPU registers prior to the time when the FMA requires the data.

The second exemplary aspect of the present invention additionally raises the issue of general implementation of the present invention in a variety of ways.

For example, it should be apparent, after having read the discussion above that the present invention could be implemented by custom designing a computer in accordance with the principles of the present invention. For example, an operating system could be implemented in which linear algebra processing is executed using the principles of the present invention.

In a variation, the present invention could be implemented by modifying standard matrix processing modules, such as described by LAPACK, so as to be based on the principles of the present invention. Along these lines, each manufacturer could customize their BLAS subroutines in accordance with these principles.

It should also be recognized that other variations are possible, such as versions in which a higher level software module interfaces with existing linear algebra processing modules, such as a BLAS or other LAPACK module, to incorporate the principles of the present invention.

Moreover, the principles and methods of the present invention could be embodied as a computerized tool stored on a memory device, such as independent diskette 500, that contains a series of matrix subroutines to solve scientific and engineering problems using matrix processing, as modified by the technique described above. The modified matrix subroutines could be stored in memory as part of a math library, as is well known in the art. Alternatively, the computerized tool might contain a higher level software module to interact with existing linear algebra processing modules.

It should also be obvious to one of skill in the art that the instructions for the technique described herein can be downloaded through a network interface from a remote storage facility.

All of these various embodiments are intended as included in the present invention, since the present invention should be appropriately viewed as a method to enhance the computation of matrix subroutines, as based upon recognizing how linear algebra processing can be more efficient by using the principles of the present invention.

In yet another exemplary aspect of the present invention, it should also be apparent to one of skill in the art that the principles of the present invention can be used in yet another environment in which parties indirectly take advantage of the present invention.

For example, it is understood that an end user desiring a solution of a scientific or engineering problem may undertake to directly use a computerized linear algebra processing method that incorporates the method of the present invention. Alternatively, the end user might desire that a second party provide the end user the desired solution to the problem by providing the results of a computerized linear algebra processing method that incorporates the method of the present invention. These results might be provided to the end user by a network transmission or even a hard copy printout of the results.

The present invention is intended to cover all these various methods of using the present invention, including the end user who uses the present invention indirectly by receiving the results of matrix processing done in accordance with the principles of the present invention.

That is, the present invention should appropriately be viewed as the concept that efficiency in the computation of matrix subroutines can be significantly improved by preloading data into the FRegs prior to being required during matrix processing.

While the invention has been described in terms of an exemplary embodiment, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A software method of improving at least one of efficiency and speed in executing a linear algebra subroutine on a computer having a floating point unit (FPU) with floating point registers (FRegs) and a load/store unit (LSU) capable of overlapping loading data and processing said data by the FPU, said FPU being interfaced with an L1 (Level 1) cache and having an L1 cache/FReg interface "loading penalty of n cycles", n being an integer greater than or equal to 1, during which data is rearranged in up to n cycles in said FRegs because data arrives out of order for said processing, said method comprising:
   loading matrix data from a memory through a cache system at a fastest possible rate; and
   then either immediately or at a later time, for an execution code controlling operation of said linear algebra subroutine execution, overlapping by preloading data into said FRegs of said FPU and then rearranging the data in said FRegs for up to said n cycles, said overlapping causing said matrix data to arrive into said FRegs from said L1 cache to be timely executed by the FPU operations of said linear algebra subroutine on said FPU.

2. The method of claim 1, wherein instructions are unrolled repeatedly until the data loading reaches a steady state in which a data loading exceeds a data consumption.

3. The method of claim 1, wherein said linear algebra subroutine comprises a matrix multiplication operation.

4. The method of claim 1, wherein said linear algebra subroutine comprises a subroutine equivalent to a LAPACK (Linear Algebra PACKage) subroutine.

5. The method of claim 4, wherein said LAPCK subroutine comprises a Level 3 Basic Linear Algebra Subprograms (BLAS) which includes L1 cache kernel routines.

6. An apparatus, comprising:
   a memory to store matrix data to be used for processing in a linear algebra program;
   an L1 (Level 1) cache to receive data from said memory;
   a floating point unit (FPU) to perform said processing; and
   a load/store unit (LSU) to load data to be processed by said FPU, said LSU loading said data into a plurality of floating point registers (FRegs), wherein said data processing overlaps said data loading such that matrix data is preloaded into said FRegs from said L1 cache prior to being required by said FPU and the preloaded data in said FRegs is rearranged for up to n cycles, n being an integer greater than or equal to 1.

7. The apparatus of claim 6, wherein said preloading is achieved by unrolling a loading instruction so that a load occurs every cycle until a preload condition has been satisfied.

8. The apparatus of claim 6, wherein said linear algebra program comprises a matrix multiplication operation.

9. The apparatus of claim 6, wherein said linear algebra program comprises a subroutine equivalent to a LAPACK (Linear Algebra PACKage) subroutine.

10. The apparatus of claim 9, wherein said subroutine comprises a Level 3 Basic Linear Algebra Subprograms (BLAS) which includes L1 cache kernel Routines.

11. The apparatus of claim 6, further comprising:
    a compiler to generate an instruction for said preloading.

12. A computer-readable storage medium tangibly embodying a program of machine-readable instructions executable by a digital processing apparatus to perform a method of improving at least one of speed and efficiency in executing a linear algebra subroutine on a computer having a floating point unit (FPU) and a load/store unit (LSU) capable of overlapping loading data and processing said data, said method comprising:
    for an execution code controlling operation of said linear algebra subroutine execution, overlapping by preloading data into a floating point registers (FRegs) of said FPU and rearranging the preloaded data in said FRegs for up to n cycles, where n is an integer greater than or equal to 1, said overlapping causing data from an L1 (Level 1) cache to arrive into said FRegs, to be timely executed by FPU operations of said linear algebra subroutine on said FPU in view of said up to n cycles used for rearranging said preloaded data.

13. The computer-readable storage medium of claim 12, wherein a load instruction is unrolled repeatedly until the data loading reaches a steady state in which a data loading exceeds a data consumption.

14. The computer-readable storage medium of claim 12, wherein said linear algebra program comprises a matrix multiplication operation.

15. The computer-readable storage medium of claim 12, wherein said linear algebra program comprises a subroutine equivalent to a LAPACK (Linear Algebra PACKage) subroutine.

16. The system of claim 15, wherein said subroutine comprises a Level 3 Basic Linear Algebra Subprograms (BLAS) which includes L1 cache kernel Routines.

17. A method of providing a service involving at least one of solving and applying a scientific/engineering problem, said method comprising:

using a linear algebra software package that computes one or more matrix subroutines, wherein said linear algebra software package generates an execution code controlling a load/store unit loading data into a floating point registers (FRegs) for a floating point unit (FPU) performing a linear algebra subroutine execution, said FPU capable of overlapping loading data and performing said linear algebra subroutine processing, such that, for an execution code controlling operation of said FPU, said overlapping causes a preloading of data from an L1 (Level 1) cache into said FRegs and then rearranges said preloaded data for up to n cycles, n being an integer greater than or equal to 1, and wherein a stride one data transfer is used for providing said data for said preloading for all operands without using a data copy processing for correcting said stride one data transfer for any operand of said linear algebra subroutine;

providing a consultation for purpose of solving a scientific/engineering problem using said linear algebra software package;

transmitting a result of said linear algebra software package on at least one of a network, a signal-bearing medium containing machine-readable data representing said result, and a printed version representing said result; and receiving a result of said linear algebra software package on at least one of a network, a signal-bearing medium containing machine-readable data representing said result, and a printed version representing said result.

18. The method of claim 17, wherein said linear algebra subroutine comprises a subroutine equivalent to a LAPACK (Linear Algebra PACKage) subroutine.

19. The method of claim 18, wherein said LAPCK subroutine comprises a Level 3 Basic Linear Algebra Subprograms (BLAS) which includes L1 cache kernel routines.

20. The method of claim 1, wherein said fastest possible rate comprises transferring said matrix data for said processing from said memory to said cache system in a stride one format, said method further comprising:

providing six kernels to be selectively available for said linear algebra subroutine execution, said selectively available six kernels thereby permitting said stride one transfer to be made without using a data copy processing for correcting said matrix data for any operand of said linear algebra subroutine.

* * * * *